United States Patent
Quell et al.

(10) Patent No.: US 7,585,157 B2
(45) Date of Patent: Sep. 8, 2009

(54) ROTOR BLADE FOR A WIND POWER STATION

(75) Inventors: Peter Quell, Osterronfeld (DE); Marc Petsche, Rensburg (DE)

(73) Assignee: Repower Systems AG, Hamburg (DE)

( * ) Notice: Subject to any disclaimer, the term of this patent is extended or adjusted under 35 U.S.C. 154(b) by 327 days.

(21) Appl. No.: 10/595,316

(22) PCT Filed: Oct. 7, 2004

(86) PCT No.: PCT/EP2004/011187

§ 371 (c)(1),
(2), (4) Date: Apr. 7, 2006

(87) PCT Pub. No.: WO2005/035978

PCT Pub. Date: Apr. 21, 2005

(65) Prior Publication Data

US 2006/0280614 A1    Dec. 14, 2006

(30) Foreign Application Priority Data

Oct. 10, 2003    (DE)    ............................... 103 47 802

(51) Int. Cl.
*F03D 1/06* (2006.01)
(52) U.S. Cl. .................................. 416/236 R
(58) Field of Classification Search ................. 416/235, 416/236 A, 236 R
See application file for complete search history.

(56) References Cited

U.S. PATENT DOCUMENTS

| | | |
|---|---|---|
| 1,446,011 A | 2/1923 | Jackson |
| 1,758,560 A * | 5/1930 | Currie .......................... 416/202 |
| 2,359,466 A * | 10/1944 | Currie .......................... 416/202 |
| 2,361,676 A | 10/1944 | Baker |
| 3,171,495 A * | 3/1965 | Puckett ......................... 416/228 |
| 6,910,867 B2 * | 6/2005 | Corten ...................... 416/223 R |
| 7,234,921 B2 * | 6/2007 | Shchukin et al. ............... 416/1 |

FOREIGN PATENT DOCUMENTS

| | | |
|---|---|---|
| CN | 1415854 A | 5/2003 |
| DE | 2135287 | 1/1973 |
| DE | 3836673 | 5/1990 |
| DE | 19815519 | 10/1999 |

(Continued)

*Primary Examiner*—Edward Look
*Assistant Examiner*—Nathaniel Wiehe
(74) *Attorney, Agent, or Firm*—Rankin, Hill & Clark LLP

(57) ABSTRACT

A rotor blade for a wind power station includes a profiled member that is provided with a relative thickness which decreases towards the outside from a root to a tip of the blade. The profiled member has a leading edge and a trailing edge as well as a suction side and a pressure side while generating a negative pressure relative to the pressure side on the suction side when being flown against by moved air, the negative pressure resulting in buoyancy. The suction side of the rotor blade encompasses a device for optimizing flow around the profiled member. The device is provided with at least one planar element that extends substantially in the direction of flow, protrudes from the suction side, and is arranged in the zone of a transversal flow which runs from the root to the tip of the blade on the suction side of the profiled member.

10 Claims, 2 Drawing Sheets

FOREIGN PATENT DOCUMENTS

| | | |
|---|---|---|
| EP | 1219837 | 7/2002 |
| GB | 840543 | 7/1960 |
| GB | 2374331 | 10/2002 |
| RU | 2218477 | 12/2003 |
| WO | 00/15961 | 3/2000 |
| WO | WO 02/08600 * | 1/2002 |

* cited by examiner

ROTOR BLADE FOR A WIND POWER STATION

BACKGROUND OF THE INVENTION

1. Field of the Invention

The present invention relates to a rotor blade for a powerplant fitted with a device optimizing aerodynamics.

2. Description of Related Art

Wind-driven power-plants comprise a rotor fitted with one or more rotor blades. Each rotor blade in turn comprises a sectional blade contour, which is perpendicular to the blade's direction from blade root to blade tip, and of which the thickness decreases toward the outside, from the blade root toward the blade tip. The blade contour entails a suction side and a pressure side, so that when air is moving around the blade, the suction side is at a lower pressure than the pressure side. The pressure differential across the pressure and suction sides generates lift causing the rotor rotation, which in turn is used to drive an electric power generator.

High rotor efficiency and hence high wind-driven powerplant output assumes, as smooth as possible, an airflow around the blade contour perpendicularly to the axis of the rotor blade and over the entire range of the rotor blades.

However, it is noted with respect to known rotor blades that the airflow moving around the blade contour will detach at the suction side and that a wake zone is generated which, by increasing drag, reduces the rotor blade lift and decelerates the rotor blade. Typically, the term "wake zone" denotes the region of the detached airflow. Both factors lower the winddriven power-plant productivity.

Seen in the direction of flow, airflow detachment as a rule takes place beyond the highest relative depth of the blade contour. In general, at least the zones near the blade root will be affected.

Vortex generators are a known means to reduce airflow detachment and thus to optimize aerodynamic airflow around the blade contour. Such generators, as a rule, are in the form of sheetmetal, bars or cross-sectionally shaped structures and the like configured at the suction side of the rotor blade and generating local turbulences reducing large-area detachment of the airflow around the blade contour. Illustratively, such vortex generators are known form the patent document WO 0015961. These known vortex generators incur the drawback that they only slightly improve wind-driven power-plant productivity because they themselves generate drag and furthermore are very noisy.

BRIEF SUMMARY OF THE INVENTION

The objective of the present invention is to create a winddriven power-plant rotor blade that offers substantially improved aerodynamic airflow around the blade.

The solution to this problem is comprehensively discussed below and is based on the insight that interfering flows are generated, in particular, in the zone of the rotor root at the suction side of the blade contour and run transversely to the rotor blade toward the blade tip. These cross-flows arise substantially in the region of the detached airflow and are assumed due to the pressure differentials caused by different incident airflow speeds at different blade radii; they are induced in an especially marked manner in the blade root zone. In addition to these factors, the centrifugal forces acting on the rotor blade also contribute to generating said crossflows.

The detachment in the rotor-blade root zone is moved by the cross-flow out of the airflow around the aerodynamically disadvantageous blade root zone toward the blade tip, that is into the zone of the aerodynamically more advantageous blade contours. Moreover the cross-flow also interferes with the effective airflow around the rotor blade because of the generation of turbulences that entail premature airflow detachment.

Accordingly, the present invention provides a wind-driven power-plant rotor blade fitted with a device optimizing the airflow around the blade contour, the device comprising at least one planar element mounted by one of its thin sides on the suction side and substantially pointing in the direction of airflow. The element is configured in the zone, the above cited cross-flow running outward on the suction side of the contour from the blade root, and the height and length of the device being selected so that it shall substantially reduce the crossflow.

The reduction of the cross-flow by the planar element prevents premature airflow detachment from the rotor blade suction side. Such improved blade-enveloping airflow achieves a considerable increase in the output of a correspondingly equipped wind-driven power-plant without entailing an increase in operational noise.

The required height and length of the particular planar element and the optimal position of this element on the suction side of the rotor blade inherently varies with the distance from the rotor axis of rotation, the blade contour depth, the rotor width, the most likely speed of the incident airflow, etc.

In the simplest way, the best configuration is ascertained empirically, for instance by affixing rows of wool threads at one end to the rotor blade and by field tests visually determining the prevailing airflow conditions by means of the said threads' free ends. In this manner the effect of planar elements of the invention on the airflow conditions may be ascertained relatively easily in various radius positions and consequently, also, the optimal number and positions, and if called for, also the sizes of the planar elements of the invention.

The wool threads may be configured, if additionally called for, on differently sized spacers, in the form of bars for instance, to determine the wake zone depth caused by the cross-flow and hence the height of the cross-flow to be stopped.

This procedure allows for empirically ascertaining the optimal height and length of the planar elements of the invention and/or their optimal positions on a particular rotor blade. Running corresponding series of tests, the optimal dimensions and positions of the planar elements of the invention may be determined for arbitrary types of rotor blades.

Planar elements preventing cross-flows mounted on the suction side of an airfoil have long been known in aeronautical engineering. These elements are especially widely used in swept-back wing aircraft. In this design, the problem arises that on account of the obliqueness of the leading airfoil edge, a pressure gradient is generated which deflects the air flowing around the airfoil toward the airfoil tip. This undetached cross-flow in turn interferes with the airflow around the airfoil and hence reduces the lift because the airflow moves along the wing, but no longer on it. To reduce the cross-flow, therefore, perpendicular barriers are affixed to such airfoils and are denoted as boundary layer fences.

These boundary layer fences differ as regards their essential features from the above-cited planar elements of the invention for wind-driven power-plant rotor blades. The undetached cross-flows at sweptback airfoils being induced foremost in the region of the airfoil leading edge, this is precisely the area where the boundary layer fences are erected. Frequently, the fences even run around the airfoil leading edge as far as to the airfoil pressure side.

The wind-driven power-plant's rotor blade planar elements of the invention, on the other hand, reduce a cross-flow which was caused by other phenomena and which already has detached and which arises predominantly in the region of maximum depth of rotor blade contour and induces airflow detachment in the region of the maximum depth. Configuring such elements merely in the region of the rotor blade leading edge would be inappropriate.

In one preferred embodiment of the present invention, the planar element is configured at least in the zone of the cross-flow running on the blade contour suction side between a zone of maximum relative blade depth and blade trailing edge. This cross-flow is the above described flow that was generated by the speed differential of the incident airflow between the zones near the rotor blade root and the zones near the blade tips and by the resulting pressure gradients at the rotor blade suction side and also the centrifugal forces at the rotor blade.

In an especially preferred embodiment mode of the present invention, the planar elements extend over the full width of the rotor blade suction side. In this manner, encroaching by the cross-flow into zones of proper airflows is precluded even without knowledge of the accurate path of the cross-flow on the rotor blade suction side.

In a further preferred embodiment of the invention, the planar element is designed so that its length runs straight. In this manner the planar element's drag is kept small and noise is minimized. In an especially preferred embodiment mode, the planar element runs no more than 10° away from the tangent to that circle formed by the rotor blade radius which is subtended by the planar element position.

In a further preferred embodiment of the invention, the planar element is designed so that its longitudinal direction follows the radius path corresponding to the distance between the planar element's front end and the rotor's axis of rotation. In turn, this design makes it possible to minimize the element's drag and its noise.

In a further preferred embodiment of the invention, the rotor blade is fitted at the suction side of its contour with several planar elements. This design is appropriate when, behind the first element, a new cross-flow as discussed herein shall be produced. Optimal positioning and sizing of these several planar elements on the rotor blade can be implemented as described above.

In a further preferred embodiment of the invention, planar elements are mounted on the rotor blade suction side in a zone extending from the blade root to half the rotor blade's length. In especially preferred manner, the zone shall extend from the blade root to one third the rotor blade's length.

In an especially preferred embodiment of the invention, at least one planar element is mounted in a zone which, as seen from the blade root, is situated beyond a transition range wherein the sectional contour of the blade root merges into a lift generating contour. An element mounted in such a zone is appropriate, for instance, to interrupt an already extant cross-flow coming from the blade root zone and in this manner to eliminate interferences from laminar airflows in this zone.

In another preferred embodiment mode, at least one planar element is mounted in a zone extending from the blade root to the near side of a transition range where the blade root contour merges into a lift-generating contour. Because of the special conditions relating to rotor blades, the substantial portion of the interfering cross-flow arises in this zone near the blade root because this rotor blade root, on account of its contour depth, as a rule is not an aerodynamically advantageous contour. Accordingly, the configuration of an element of the invention in this zone especially effectively suppresses the formation of cross-flows—contrary to the case of the above described elements which are configured in a manner that they prevent propagation of an already extant cross-flow into the power-delivering rotor blade zone.

In a further advantageous embodiment of the invention, the planar element is air-permeable at least segment-wise, for instance being a mesh or perforated. A planar element of this design, when appropriately dimensioned, may better reduce cross-flows than a continuous planar element. Also, such a design reduces the planar element weight.

In a further embodiment mode of the invention, the planar element is made of a metal, for instance high-grade steel or aluminum, of plastic, of compound materials such as GRP (glass-fiber reinforced plastic) or CFP (carbon-fiber reinforced plastic), or of a combination of such materials. Such a design assures that the element shall both be weather-proof and withstand the operational mechanical loads. It is understood that other materials may be employed in an equivalent manner provided they meet the conditions of weathering and mechanical strength.

The invention applies not only to rotor blades but also to planar elements that may be aligned in a sectionally contoured wind-driven power-plant rotor blade substantially in the direction of the airflow and at a spacing from the suction side, their height and length being selected in a way that they shall implement an effective reduction of a cross-flow running outward from the blade root. These elements may also be used to retrofit already erected wind-driven power-plants.

A preferred embodiment provides that the planar element be configured to be tightly adjoined to the contour of the rotor section. However, the element also may be deformed in an elastic or plastic manner to allow it to be matched to the contour of the rotor section at the first instance it is assembled to it.

The present invention is shown in illustrative and schematic manner in the drawings of a preferred embodiment.

DETAILED DESCRIPTION OF THE INVENTION

Figure 1:
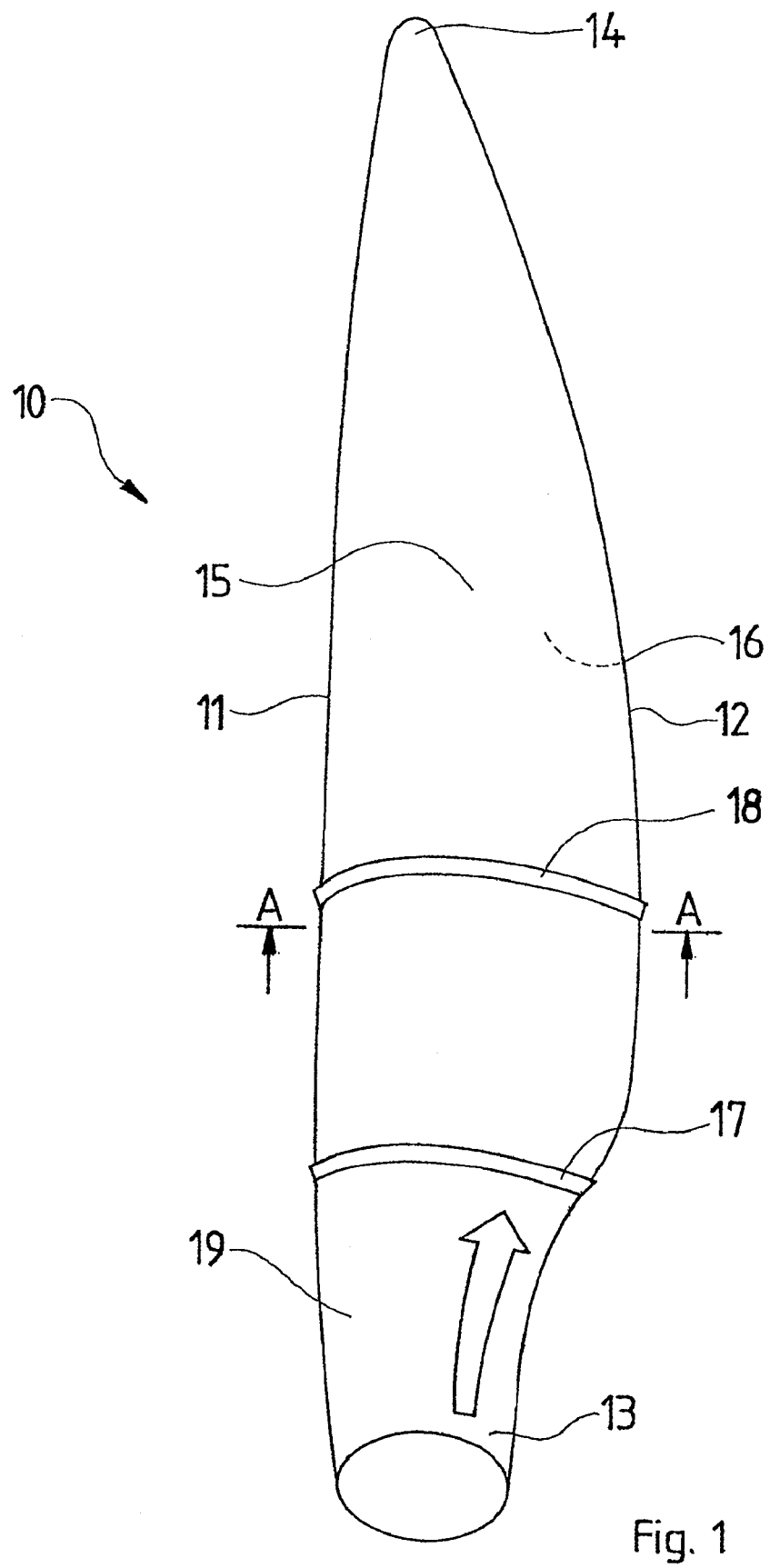
FIG. 1 is the top view of the suction side of a wind-driven power-plant rotor blade.

FIG. 1 shows a rotor blade 10 having a leading edge 11, a trailing edge 12, a blade root 13, a blade tip 14, a suction side 15 and a pressure side 16. The relative thickness of the rotor blade decreases towards the outside from the blade root 13 to the blade tip 14. The leading edge 11 points in the direction of rotation of the rotor blade. Planar elements 17 and 18 are mounted in the direction of airflow at the suction side 15 and suppress cross-flows on the suction side 15 and preclude premature airflow detachment. A transition range 19 is characterized in that the contour of the blade root 13, which in this instance is cylindrical, merges into a pear-shaped, lift-generating contour. An arrow denotes the cross-flow.

Figure 2A:
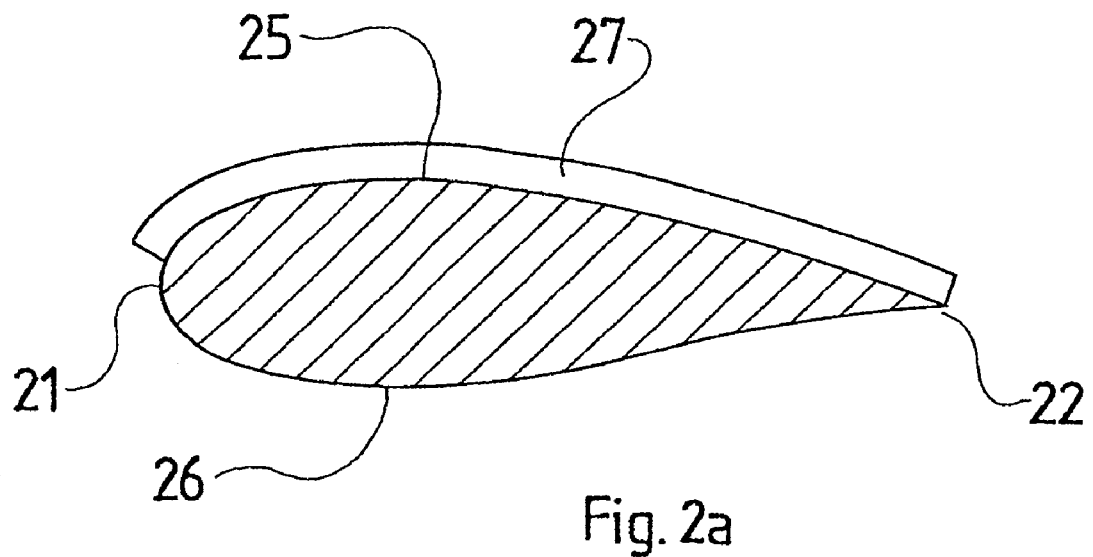
FIG. 2a is a section along line A-A of FIG. 1.

FIG. 2a shows a section of the rotor blade along line A-A of FIG. 1, the blade having a leading edge 21, a trailing edge 22, a suction side 25 and a pressure side 26. The planar element 27 is mounted on the suction side 25 and runs from the leading edge 21 to the trailing edge 22 and suppresses cross-flows on the suction side 25.

Figure 2B:
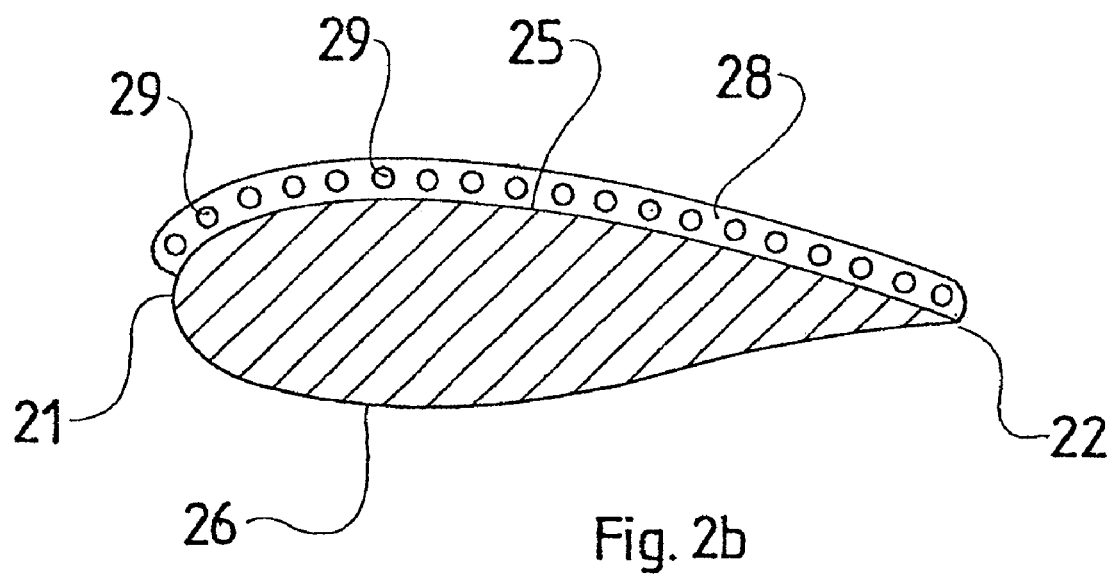
FIG. 2b is a further section along line A-A of FIG. 1 in another embodiment mode.

FIG. 2b shows a further section of the rotor blade along line A-A in FIG. 1 for another embodiment mode, the blade having a leading edge 21, a trailing edge 22, a suction side 25 and a pressure side 26. The planar element 28 is mounted on the suction side 25 and runs from the leading edge 21 to the trailing edge 22, and is fitted with rounded edges. The planar element 28 is fitted with perforations 29 which, when appropriately sized, contribute to effectively suppress cross-flows on the suction side 25.

The invention claimed is:

1. A wind-driven power-plant rotor blade comprising a sectional contour having a relative thickness which decreases toward the outside from a blade root to a blade tip, said blade contour comprising a leading edge and a trailing edge and also a suction side and a pressure side, said contoured blade when being impacted by an incident airflow generating reduced pressure at the suction side relative to the pressure side, the pressure differential resulting in lift, the suction side being fitted with a device optimizing the incident airflow around the said blade, wherein the device comprises at least one planar element (17, 18) which is mounted by one of its narrow sides onto the suction side (15) and which runs substantially in the direction of the incident airflow on the suction side (15) of said blade contour in the zone of a cross-flow on this suction side (15) from the blade root (13) to the blade tip (14), the height and length of the planar element (17, 18) being selected so that said element shall effectively reduce said cross-flow, wherein the rotor blade is fitted with several planar elements on its suction side which are mounted on the rotor blade suction side only in a zone extending from the blade root to half the length of the rotor blade.

2. The rotor blade as claimed in claim 1, wherein the planar element is mounted at least in a region of a cross-flow running on the suction side of the blade contour between a zone of maximum relative contour depth and the blade trailing edge.

3. The rotor blade as claimed in claim 1, wherein the length of the planar element extends over the full width of the rotor blade suction side.

4. The rotor blade as claimed in claim 1, wherein the planar element is straight in its longitudinal direction.

5. The rotor blade as claimed in claim 4, wherein the direction of the planar element does not deviate more than 10° from a tangent line touching a circle formed by a radius subtended by the planar element position.

6. The rotor blade as claimed in claim 1, wherein the planar element is constituted in a manner that it extends in its longitudinal direction to follow the path of a radius subtended by the distance between the front end of the planar element and the axis of rotation of the rotor blade.

7. The rotor blade as claimed in claim 1, wherein the planar elements are mounted on the rotor blade suction side in a zone extending from the blade root to one third the length of said blade.

8. The rotor blade as claimed in claim 1, wherein at least one planar element is mounted in a zone extending from the blade root to beyond a transition range wherein the blade root contour merges into a blade-lift generating contour.

9. The rotor blade as claimed in claim 1, wherein at least one planar element is mounted in a zone situated from the blade root to the near side of a transition range where the blade root contour merges into a lift-generating blade contour.

10. A wind-driven power-plant rotor blade comprising a sectional contour having a relative thickness which decreases toward the outside from a blade root to a blade tip, said blade contour comprising a leading edge and a trailing edge and also a suction side and a pressure side, said contoured blade when being impacted by an incident airflow generating reduced pressure at the suction side relative to the pressure side, the pressure differential resulting in lift, the suction side being fitted with a device optimizing the incident airflow around the said blade, wherein the device comprises at least one planar element (17, 18) which is mounted by one of its narrow sides onto the suction side (15) and which runs substantially in the direction of the incident airflow, said planar element being arranged in the zone of a cross-flow on the suction side (15) from the blade root (13) to the blade tip (14), the height and length of the planar element (17, 18) being selected so that said element shall effectively reduce said cross-flow, wherein the planar element is air-permeable at least segment-wise, having the form of a grid or perforations.

* * * * *